United States Patent [19]

Zimmer et al.

[11] Patent Number: 5,798,405

[45] Date of Patent: Aug. 25, 1998

[54] TIRE WITH TREAD OF RUBBER COMPOSITION CONTAINING TWO DIFFERENT CARBON BLACKS

[75] Inventors: René Jean Zimmer, Howald; Friedrich Visel, Bofferdange, both of Luxembourg; Uwe Ernst Frank, Marpingen, Germany; Thierry Florent Edmé Materne, Attert, Belgium; Giorgio Agostini, Colmar-Berg, Luxembourg

[73] Assignee: The Goodyear Tire & Rubber Company, Akron, Ohio

[21] Appl. No.: 941,180

[22] Filed: Sep. 30, 1997

Related U.S. Application Data

[60] Provisional application No. 60/041,126 Mar. 20, 1997.

[51] Int. Cl.$^6$ ............................................. C08K 3/00
[52] U.S. Cl. ..................... 524/496; 524/492; 524/493; 524/495
[58] Field of Search ............................. 524/492, 493, 524/495, 496

[56] References Cited

U.S. PATENT DOCUMENTS 5,430,087   7/1995   Carlson et al. .................... 524/496

Primary Examiner—Edward J. Cain
Attorney, Agent, or Firm—Henry C. Young, Jr.

[57] ABSTRACT

The invention relates to a tire with a tread composed of a rubber composition containing carbon black reinforcement as significant quantities two different carbon blacks and without quantitative amounts of silica reinforcement.

37 Claims, No Drawings

TIRE WITH TREAD OF RUBBER COMPOSITION CONTAINING TWO DIFFERENT CARBON BLACKS

This application claims the benefit of provisional application Ser. No. 60/041,126 filed Mar. 20, 1997.

FIELD

The invention relates to a tire with a tread composed of a rubber composition containing significant amounts of carbon black reinforcement without quantitative amounts of silica reinforcement.

BACKGROUND

Rubber compositions are typically used for tire treads which may be optimized for various rubber composition properties to promote three tire properties; namely, traction, rolling resistance and treadwear.

In this regard, typically desirable physical properties for tire tread rubber compositions may include, for example, hardness, modulus, hysteresis as indicated by rebound properties, tangent delta (Tan. delta) at 0° C., and abrasion resistance as indicated by DIN abrasion values. Such physical properties are well known to those having skill in the rubber compounding art and, in general, are considered to be predictive of tire tread performance.

Reinforcement of rubber compositions with using two different carbon blacks has previously been suggested, for example, in U.S. Pat. No. 5,430,087 (Carlson, et al). In the Carlson patent, a rubber composition is recited which contains two carbon blacks, fumed silica and silane coupler. The two carbon blacks are required to have differing Iodine Adsorption Numbers (one with an Iodine Number greater than 115 and one with an Iodine Number less than 115) but with similar structures (similar dibutylphthalate, DBP, values), namely, with DBP values, for example, either greater than 110 or less than 110. Suggested pairs of carbon blacks are (i) N231 and N774 and (ii) N234 and N550.

In the description of this invention, the term "phr," where used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

SUMMARY AND DESCRIPTION OF THE INVENTION

In accordance with this invention, a rubber composition is provided which comprises (A) 100 parts by weight of at least one diene-based elastomer, (B) about 35 to about 110, alternatively about 40 to about 110, phr particulate carbon black reinforcing filler and from zero to about 10, preferably about zero, phr of precipitated silica, wherein said carbon black reinforcement is comprised of (i) about 25 to about 100, alternatively about 30 to about 100, phr of a first carbon black having a dibutylphthalate (DBP) Adsorption Number in a range of about 120 to about 140 cc/100 gm with a corresponding Iodine Adsorption Number in a range of about 110 to about 130 g/kg and (ii) about 10 to about 45, alternatively about 15 to about 40, phr of a second carbon black having a DBP Adsorption Number in a range of about 80 to about 110 cc/100 gm with a corresponding Iodine Number in a range of about 25 to about 45 g/kg; wherein the weight ratio of said first carbon black to said second carbon black is in a range of about 55/45 to about 80/20, alternatively about 60/40 to about 75/25; and wherein the DBP Number of the first carbon black differs from that of the second carbon black by at least 30 and the Iodine Number of the first carbon black differs from that of the second carbon black by at least 80.

Preferably, the rubber composition is exclusive of silica, including precipitated silica, or in an alternative embodiment, contains only from about 5 to about 10 or perhaps from 5 to about 15, phr of precipitated silica. Other forms of silica, including fumed silica which is different from precipitated silica, are not preferred.

In further accordance with this invention, a tire having a tread of such rubber composition is provided.

FURTHER DETAILED DESCRIPTION

It is considered that this invention is particularly applicable where it is desired to endeavor to minimize tire tread rolling resistance for a tire tread elastomer composition, but where it is also desired to substantially retain rubber composition physical properties such as, for example, DIN abrasion, stiffness, tensile strength and modulus.

According to this invention, it is believed to be a very substantial departure from past practice, for rubber tire treads, to utilize dual carbon blacks, with significant amounts for each carbon black, for the carbon black reinforcement in a manner described herein. In this invention, the carbon black reinforcement requires two carbon blacks which have differing structures as evidenced by their required spaced apart DBP Adsorption Numbers and differing surface areas as evidenced by their spaced apart Iodine Adsorption Numbers.

It is understood that the DBP (dibutylphthalate) Adsorption Numbers may be determined by ASTM test D2414 and the Iodine Number may be determined by ASTM test D1510.

Carbon black properties such as Iodine Number and DBP oil Adsorption Numbers are well known to those having skill in such art.

For example, the Iodine Number for carbon black is a measure of its surface area and is expressed in units of g/kg. A higher Iodine Number is indicative of smaller particle size which, in turn, is indicative of higher surface area for the carbon black and typically a higher reinforcing carbon black for elastomers.

The DBP (dibutylphthalate) Adsorption Number for carbon black is a measure of its structure, or aggregate size and is expressed in cubic centimeters per 100 grams of carbon black. A higher DBP Adsorption Number indicative of larger aggregates which, in turn, is indicative of higher structure for the carbon black.

Iodine Numbers and DBP Numbers together with representative ASTM designated N- numbers may be found, for example, in *The Vanderbilt Rubber Handbook, Thirteenth Edition* (1990), page 417. Apparently, the DBP Number is indicative of structure with a higher number indicating a higher structure. Apparently, the Nitrogen Adsorption Number is indicative of surface area with a higher number indicating a higher surface area and, usually, a smaller particle size.

An essential part of the present invention is the use of a mixture of two different carbon blacks having both a differing surface area (Iodine Number) and a differing structure (DBP Number).

The first carbon black used is a high reinforcing carbon black of the type often used in tire tread rubber compositions. The first carbon black is required to have a DBP Adsorption Number in a range of about 115 to about 135 cc/100 gm and a corresponding Iodine Number in a range of about 110 to about 130 g/kg. Representative carbon blacks that fall within the above ranges include N121, N220 and N234. Preferably, the first carbon black is N234 which has a DBP Number of about 125 and an Iodine Adsorption Number of about 118. The aforesaid N121 and N220 carbon blacks reportedly have a DBP Number of about 130 and 114, respectively, and an Iodine Adsorption Number of about 120 and 121, respectively.

The second carbon black is a low reinforcing carbon black and is required to have a DBP Adsorption Number in a range of about 80 to about 110 cc/100 gm with a corresponding Iodine Adsorption Number in a range of about 25 to about 45 g/kg. Representative of such a carbon black that falls within the above ranges is N660. The N660 carbon black has a DBP Number of about 91 and an Iodine Adsorption Number of about 36.

A combination of N234 and N660 carbon blacks is preferred.

The weight ratio of the first carbon black (high reinforcing) to the second carbon black (low reinforcing) may vary within the aforesaid ranges so long as the high reinforcing carbon black is in the majority, eg. at least 55 percent, of the total of the two carbon blacks in the rubber composition are concerned.

It is considered herein that an important aspect of the invention is that mixtures of specific high reinforcing carbon black (the carbon black with the high DBP Number) and specific low reinforcing carbon black (the carbon black with the low DBP Number) can be used to reinforce elastomers, promoting rubber compositions having attendant enhanced physical properties such as, for example, higher hot rebound, as compared to using the high reinforcing carbon black alone to reinforce the rubber composition, which is indicative of lower hysteresis which, in turn, is predictive of reduction in rolling resistance for a tire tread which are anticipated to be improved without significant reduction in reinforcement of the rubber composition as might be evidenced by substantially maintaining a DIN abrasion value for the cured rubber composition.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound such as, for example, styrene and alpha-methylstyrene. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70-95 percent trans), low vinyl polybutadiene rubber (10-30 percent vinyl), high vinyl polybutadiene rubber (30-90 percent vinyl).

In one aspect, the rubber is preferably comprised of at least two diene-based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30-55 percent vinyl), high vinyl polybutadiene rubbers (55-90 percent vinyl) and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90 percent cis 1,4-content.

The cis 1,4-polyisoprene and cis 1,4-polyisoprene natural rubber are well known to those having skill in the rubber art.

A styrene/isoprene/butadiene terpolymer elastomer (SIBR) may be used in rubber composition of this invention.

Representative examples of various SIBR's may be found, for example, in U.S. Pat. Nos. 5,137,998, 5,159,020 and 5,272,220.

It is one important aspect of this invention that the dual carbon black reinforcement might be used exclusive of, or in the absence of, any appreciable amount of silica reinforcement (eg: zero, or up to 10 or even up to 15, phr although zero or about zero phr may be preferred, of precipitated silica) to achieve a reduction of rebound values for a rubber composition intended for use as a tire tread, while still maintaining a satisfactory DIN abrasion value for the cured rubber composition, as compared to using a high structure carbon black alone for the rubber reinforcement. While it has been contemplated that addition of substantial and, therefore, quantitative amounts of precipitated silica, together with a silica coupler, as compared to use of a carbon black reinforcement, to a rubber composition may enhance, or promote, a reduction in rebound values and, therefore, hysteresis which is predictive of a reduction in rolling resistance for a tire tread, the significance of this invention is that, for many rubber composition contemplated for use as a tire tread, the quantitative use of silica reinforcement may not be necessary, where relatively low tire tread rolling resistance is a significant consideration for the tire tread. The significance of this discovery, at least in one sense, is even greater than taken into consideration that the silica is considerably more expensive than the carbon black and, further, that considerably more mixing and thus rubber processing, time is normally required when using quantitative amounts of silica reinforcement for the rubber composition.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, coupling agent, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in the *Vanderbilt Rubber Handbook* (1978), pages 344-346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention which is more primarily directed to the utilization of significant amounts of each of the two carbon blacks, without using silica, or at least using any quantitative amount of silica specified blends of two carbon blacks in rubber compositions for tire treads.

The rubber composition may be and is preferably prepared by thermomechanically working and mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature in a range of about 160° C. to about 190° for a sufficient duration of time, usually within about 4 to about 8 minutes, followed by a final mix stage in which the curatives, such as sulfur and accelerators, are added and mixed therewith for about 1 to about 4 minutes to a temperature within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (i) adjusting the motor speed of the mixer, namely reducing the motor speed after the desired temperature of the rubber composition is reached, in a variable speed mixer or by (ii) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

EXAMPLE I

In this example, rubber compositions are prepared which contain a high reinforcing carbon black as N234 (Exp A), a low reinforcing carbon black as N660 (Exp B) and a rubber composition containing both the high reinforcing (N234) and the low reinforcing (N660) blacks as Exp C.

All of the rubber compositions for this Example were prepared as a blend of solution polymerization prepared styrene/butadiene copolymer rubber, and cis 1,4-polybutadiene rubber.

The compositions were prepared by mixing the ingredients in several stages, namely, one non-productive stage (without the curatives) followed by a productive mix stage (for the curatives), then the resulting composition was cured under conditions of elevated pressure and temperature.

For the non-productive mixing stage, exclusive of the accelerator(s) and sulfur curatives which are mixed (added) in the final, productive mixing stage, the ingredients, including the elastomers, are mixed for about four minutes to a temperature of about 160° C. In a final productive mixing stage the curatives are mixed with the rubber composition (mixture) in a Banbury type mixer; namely, the accelerator (s) and sulfur to a maximum temperature of about 120° C. for about three minutes.

The resulting rubber compositions were then vulcanized at a temperature of about 150° C. for about 18 minutes.

TABLE 1

| | Sample No. | | |
|---|---|---|---|
| | Exp A | Exp B | Exp C |
| Non-Productive Mix Stages | | | |
| S-SBR Rubber[1] | 96.25 | 96.25 | 96.25 |
| Cis BR Rubber[2] | 30 | 30 | 30 |
| Processing Oil[3] | 1.8 | 1.8 | 1.8 |
| Zinc Oxide | 3.5 | 3.5 | 3.5 |
| Fatty Acid | 2 | 2 | 2 |
| Antioxidant[4] | 2 | 2 | 2 |

TABLE 1-continued

| | Sample No. | | |
|---|---|---|---|
| | Exp A | Exp B | Exp C |
| Carbon Black, First (N234)[5] | 70 | 0 | 45 |
| Carbon Black, Second (N660)[6] | 0 | 70 | 25 |
| Productive Mix Stage | | | |
| Sulfur | 1.4 | 1.4 | 1.4 |
| Accelerators[7] | 1.1 | 1.1 | 1.1 |

[1])Organic solvent solution polymerization prepared styrene/butadiene copolymer rubber obtained as Buna 5025-1 from the Bayer A.G. company reportedly having a styrene content of about 25 percent and a Tg of about -18° C.;
[2])Cis 1,4-polybutadiene rubber obtained as SKD-EF from the EFREMOV company having a cis content of about 93 percent;
[3])Aromatic rubber processing oil;
[4])Of the alkylaryl paraphenylene diamine type;
[5])N234 carbon black having an Iodine Number of about 120 g/kg and a corresponding DBP Adsorption Number of about 125 cc/100 gm;
[6])N660 carbon black having an Iodine Number of about 36 g/kg and a corresponding DBP Adsorption Number of about 900 cc/100 gm;
[7])Accelerators of the sulfenamide type.

The physical properties for the resulting vulcanized rubber compositions are shown in the following Table 2.

The DIN abrasion test is sometimes referred to as "DIN 53516" and is indicative of rubber wear due to abrasion. The DIN abrasion test is well known to those skilled in such art. A higher value is indicative of a larger amount of rubber removed by abrasion and, thus, a greater amount of wear for the rubber sample.

All of the other tests including the tensile strength, elongation, 300 percent modulus, hot and cold rebound and hardness methods of rubber characterization are well known to those having skill in such art.

TABLE 2

| | Sample No. | | |
|---|---|---|---|
| | Exp A | Exp B | Exp C |
| Stress-Strain | | | |
| Tensile strength, MPa | 17.5 | 12.3 | 15.6 |
| Elongation at Break, % | 557 | 540 | 565 |
| 300% Modulus, MPa | 8.6 | 7.0 | 8.1 |
| Rebound | | | |
| 23° C., (%) | 25.2 | 45 | 32 |
| 100° C., (%) | 49.7 | 71 | 61.2 |
| Delta Rebound (%) | 24.5 | 26 | 29.2 |
| Hardness (Shore A) | | | |
| Room Temp (about 23° C.) | 64 | 55 | 61 |
| DIN Abrasion | | | |
| Volume Loss (cc) | 99.9 | 208 | 104 |

The above recited Delta Rebound is simply the difference between the 100° C. and the 23° C. Rebound values.

In this Example the Rebound values and DIN abrasion for the rubber samples containing the high structure carbon black N234 (Exp A), the low structure carbon black N660 (Exp B) are compared to the rubber composition containing both of the N234 and the N660 carbon blacks as reinforcement (Exp C), all without an inclusion of precipitated silica.

The rubber composition containing both the high reinforcing and the low reinforcing carbon black (Exp C) had a Rebound value comparing more favorably with the rubber composition containing only the low reinforcing carbon black N660 (Exp B) and showing a definite improvement over using the high reinforcing carbon black N234 alone (Exp A).

The Rebound values for Exp's B and C, namely, the values for 100° C. and for 23° C., or room temperature, were significantly higher than the Rebound value for Exp A. Higher rebound values indicate lower hysteresis for the rubber composition and is predictive of reduced rolling resistance for a tire tread and, thus, greater vehicular fuel economy.

The Delta Rebound is the mathematical difference between the Rebound value at 100° C. and the Rebound value at room temperature, or about 23° C.

The Delta Rebound for a rubber sample is considered herein to be indicative of a rolling resistance/wet traction trade-off for a tire tread. Usually a greater Delta Rebound is considered to be better for a tire tread rubber composition since it is indicative of a decoupling of the hysteretic losses for the rubber composition between the high (100° C.) and the low (23° C.) temperature ranges.

Interestingly, the Delta Rebound for the Exp C rubber sample is greater than the Delta Rebound for the Exp A or Exp B rubber samples which indicates a greater decoupling of hysteretic losses between 100° C. and 23° C., as recited above. A greater Delta Rebound value is considered herein to represent a better wet skid/rolling resistance trade off. In particular, the greater Delta Rebound value for the Exp rubber sample is, therefore, considered herein be beneficial for a tire tread rubber composition as being indicative of an enhancement of both a wet skid property (increase of anticipated wet skid resistance of a tire tread) and rolling resistance performance (reduction in anticipated tire rolling resistance for a tire with tread of such rubber composition) at the same time, which is considered herein to be unusual as one of such properties is often improved to the detriment of the other property.

The Delta Rebound, therefore, indicates an advantage of using the dual carbon black reinforcement of this invention for a tire tread rubber composition as compared to using the high reinforcing carbon black N234 and the relatively low reinforcing carbon black N660 individually.

It is observed that the DIN abrasion value was improved in Exp's A and C as compared to Exp B. A lower DIN abrasion value is usually more desirable.

The rubber composition containing both the high reinforcing and the low reinforcing carbon black (Exp C) had a DIN abrasion value comparing more favorably with the rubber composition containing only the high reinforcing carbon black N234 (Exp A) and showing a very definite and substantial improvement over using the low reinforcing carbon black N660 alone (Exp B).

Comparatively, rubber composition using the combination of the high and low structure carbon blacks (Exp C) demonstrated a desirable Hot Rebound value more similar to the rubber composition containing the low structure carbon black (Exp B) while also demonstrating a DIN abrasion value more similar to the rubber composition containing the high structure carbon black (Exp A).

Also significantly, the Shore A hardness property of the rubber composition using the combination of high structure and the low structure carbon blacks (Exp C) compared favorably to the rubber composition using the low structure carbon black N660 (Exp B), therefore, further demonstrating an enhanced reinforcement for the Exp C. rubber composition.

Therefore, insofar as providing a tread rubber with higher Rebound values which is considered to be predictive of lower tire rolling resistance, higher Delta Rebound values which is considered to be predictive of a better wet skid/ rolling resistance trade off, and lower DIN abrasion values, predictive of less wear, the use of a combination of significant amounts of both the first and second carbon blacks, namely the N234 and N660 carbon blacks, is considered herein to be beneficial, as compared to using either of the carbon blacks alone.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition which comprises (A) 100 parts by weight of at least one diene-based elastomer, (B) about 35 to about 110 phr particulate carbon black reinforcing filler and from zero up to about 10 phr of precipitated silica wherein said carbon black reinforcement is comprised of (i) about 25 to about 100 phr of a first carbon black having a dibutylphthalate (DBP) Adsorption Number in a range of about 120 to about 140 cc/100 gm with a corresponding Iodine Adsorption Number in a range of about 110 to about 130 g/kg and (ii) about 10 to about 45 phr of a second carbon black having a DBP Adsorption Number in a range of about 80 to about 110 cc/100 gm with a corresponding Iodine Adsorption Number in a range of about 25 to about 45 g/kg; wherein the weight ratio of the first carbon black to the second carbon black is in a range of about 55/45 to about 80/20; and wherein the DBP Number of the first carbon black differs from that of the second carbon black by at least 30 and the Iodine Number of the first carbon black differs from that of the second carbon black by at least 80.

2. The rubber composition of claim 1 wherein the diene-based elastomer is selected from at least one of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and emulsion polymerization prepared butadiene/acrylonitrile copolymers.

3. The rubber composition of claim 1 wherein said rubber composition is exclusive of silica.

4. The rubber composition of claim 1 wherein said rubber composition contains from about 5 to about 10 phr of silica.

5. The rubber composition of claim 2 wherein said rubber composition is exclusive of silica.

6. The rubber composition of claim 2 wherein said rubber composition contains from about 5 to about 10 phr of silica.

7. The rubber composition of claim 2 which also contains from about 2 to about 15 phr of precipitated silica.

8. The rubber composition of claim 1 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

9. The rubber composition of claim 2 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

10. The rubber composition of claim 3 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

11. The rubber composition of claim 4 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

12. The rubber composition of claim 5 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

13. The rubber composition of claim 6 wherein the said first carbon black is selected from at least one of N121, N220, N234, and N299 carbon blacks and said second carbon black is N660 carbon black and where the ratio of said first carbon black to said second carbon black is in a range of about 60/40 to about 75/25.

14. The rubber composition of claim 1 where the first carbon black is N234 carbon black and the second carbon black is N660 and the ratio of said first carbon black to said second carbon black is in a range of about 60/40 to about 75/25.

15. The rubber composition of claim 2 where the first carbon black is N234 carbon black and the second carbon black is N660 and the ratio of said first carbon black to said second carbon black is in range of about 60/40 to about 75/25.

16. The rubber composition of claim 3 where the first carbon black is N234 carbon black and the second carbon black is N660 and the ratio of said first carbon black to said second carbon black is in a range of about 60/40 to about 75/25.

17. The rubber composition of claim 4 where the first carbon black is N234 carbon black and the second carbon black is N660 and the ratio of said first carbon black to said second carbon black is in a range of about 60/40 to about 75/25.

18. The rubber composition of claim 5 where the first carbon black is N234 and the second carbon black is N660 carbon black and the ratio of said first carbon black to said second carbon black is in range of about 75/25.

19. The rubber composition of claim 6 where the first carbon black is N234 and the second carbon black is N660 carbon black and the ratio of said first carbon black to said second carbon black is in range of about 75/25.

20. A tire having a tread of the rubber composition of claim 1.

21. A tire having a tread of the rubber composition of claim 2.

22. A tire having a tread of the rubber composition of claim 3.

23. A tire having a tread of the rubber composition of claim 4.

24. A tire having a tread of the rubber composition of claim 5.

25. A tire having a tread of the rubber composition of claim 6.

26. A tire having a tread of the rubber composition of claim 7.

27. A tire having a tread of the rubber composition of claim 8.

28. A tire having a tread of the rubber composition of claim 9.

29. A tire having a tread of the rubber composition of claim 10.

30. A tire having a tread of the rubber composition of claim 11.

31. A tire having a tread of the rubber composition of claim 12.

32. A tire having a tread of the rubber composition of claim 13.

33. A tire having a tread of the rubber composition of claim 14.

34. A tire having a tread of the rubber composition of claim 15.

35. A tire having a tread of the rubber composition of claim 16.

36. A tire having a tread of the rubber composition of claim 17.

37. A tire having a tread of the rubber composition of claim 18.

* * * * *